United States Patent
Bachar et al.

(10) Patent No.: US 11,363,180 B2
(45) Date of Patent: Jun. 14, 2022

(54) SWITCHABLE CONTINUOUS DISPLAY INFORMATION SYSTEM ABOVE CAMERA

(71) Applicant: Corephotonics Ltd., Tel-Aviv (IL)

(72) Inventors: Gil Bachar, Tel Aviv (IL); Ephraim Goldenberg, Ashdod (IL); Roy Rudnick, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 16/632,342

(22) PCT Filed: Jul. 21, 2019

(86) PCT No.: PCT/IB2019/056225
§ 371 (c)(1),
(2) Date: Jan. 18, 2020

(87) PCT Pub. No.: WO2020/031005
PCT Pub. Date: Feb. 13, 2020

(65) Prior Publication Data
US 2021/0360131 A1 Nov. 18, 2021

Related U.S. Application Data

(60) Provisional application No. 62/714,685, filed on Aug. 4, 2018.

(51) Int. Cl.
*H04N 5/225* (2006.01)
*G02B 27/10* (2006.01)
(Continued)

(52) U.S. Cl.
CPC ......... *H04N 5/2257* (2013.01); *G02B 27/106* (2013.01); *G09G 3/007* (2013.01); *G09G 3/20* (2013.01)

(58) Field of Classification Search
CPC ...... H04N 5/2257; G02B 27/106; G09G 3/07; G09G 3/20
(Continued)

(56) References Cited

U.S. PATENT DOCUMENTS 4,199,785 A  4/1980 McCullough et al.
5,005,083 A  4/1991 Grage et al.
(Continued)

FOREIGN PATENT DOCUMENTS

CN  101276415 A  10/2008
CN  201514511 U  6/2010
(Continued)

OTHER PUBLICATIONS

Statistical Modeling and Performance Characterization of a Real-Time Dual Camera Surveillance System, Greienhagen et al., Publisher: IEEE, 2000, 8 pages.
(Continued)

*Primary Examiner* — Prabodh M Dharia
(74) *Attorney, Agent, or Firm* — Nathan & Associates; Menachem Nathan

(57) ABSTRACT

Systems comprising a display having a first pixel array and a gap in the first pixel array in which at least some pixels of the first pixel array are missing, a device such as a camera, a light emitting device or a light receiving device, and a second pixel array. The systems are operable in a first operation mode in which the camera or light emitting device are operative while the second pixel array is not operative to display information, and in a second operation mode in which the camera or light emitting device are not operative while the second pixel array is operative to display the second array pixel information in the gap in the first pixel array. Systems are also operable in a third operation mode.

8 Claims, 6 Drawing Sheets

(51) Int. Cl.
  *G09G 3/00* (2006.01)
  *G09G 3/20* (2006.01)
(58) Field of Classification Search
  USPC .......................................... 345/694; 463/31
  See application file for complete search history.

(56) References Cited

U.S. PATENT DOCUMENTS

| | | |
|---|---|---|
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,657,402 A | 8/1997 | Bender et al. |
| 5,682,198 A | 10/1997 | Katayama et al. |
| 5,768,443 A | 6/1998 | Michael et al. |
| 5,801,758 A * | 9/1998 | Heirich .................. H04N 7/144 348/14.08 |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,208,765 B1 | 3/2001 | Bergen |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0240052 A1 | 12/2004 | Minefuji et al. |
| 2005/0013509 A1 | 1/2005 | Samadani |
| 2005/0046740 A1 | 3/2005 | Davis |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0072027 A1 * | 4/2006 | Shibayama ........ H04N 1/00307 348/333.1 |
| 2006/0102907 A1 | 5/2006 | Lee et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0126911 A1 | 6/2007 | Nanjo |
| 2007/0177025 A1 | 8/2007 | Kopet et al. |

(56) References Cited

U.S. PATENT DOCUMENTS

| | | |
|---|---|---|
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0196001 A1 | 8/2010 | Ryynnen et al. |
| 2010/0238327 A1 | 9/2010 | Griffith et al. |
| 2010/0259836 A1 | 10/2010 | Kang et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0298966 A1 | 12/2011 | Kirschstein et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0155176 A1 | 6/2013 | Paripally et al. |
| 2013/0182150 A1 | 7/2013 | Asakura |
| 2013/0190086 A1* | 7/2013 | Maison .................. A63F 13/213 463/31 |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0270419 A1 | 10/2013 | Singh et al. |
| 2013/0278785 A1 | 10/2013 | Nomura et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0138381 A1 | 5/2015 | Ahn |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0064282 A1* | 3/2017 | Lo ........................ H04N 13/282 |
| 2017/0070731 A1 | 3/2017 | Darling et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0242225 A1 | 8/2017 | Fiske |
| 2017/0289458 A1 | 10/2017 | Song et al. |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0198897 A1 | 7/2018 | Tang et al. |
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2019/0121103 A1 | 4/2019 | Bachar et al. |
| 2019/0130822 A1 | 5/2019 | Jung et al. |
| 2020/0162673 A1* | 5/2020 | Kanda .............. H04N 5/232122 |

FOREIGN PATENT DOCUMENTS

| | | |
|---|---|---|
| CN | 102739949 A | 10/2012 |
| CN | 103024272 A | 4/2013 |
| CN | 103841404 A | 6/2014 |

(56) References Cited

FOREIGN PATENT DOCUMENTS

| | | |
|---|---|---|
| CN | 107682489 A | 2/2018 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2004133054 A | 4/2004 |
| JP | 2004245982 A | 9/2004 |
| JP | 2005099265 A | 4/2005 |
| JP | 2006237914 A | 9/2006 |
| JP | 2006238325 A | 9/2006 |
| JP | 2007228006 A | 9/2007 |
| JP | 2007306282 A | 11/2007 |
| JP | 2008076485 A | 4/2008 |
| JP | 2010204341 A | 9/2010 |
| JP | 2011085666 A | 4/2011 |
| JP | 2013106289 A | 5/2013 |
| KR | 20070005946 A | 1/2007 |
| KR | 20090058229 A | 6/2009 |
| KR | 20100008936 A | 1/2010 |
| KR | 20130104764 A | 9/2013 |
| KR | 20140014787 A | 2/2014 |
| KR | 101477178 B1 | 12/2014 |
| KR | 20140144126 A | 12/2014 |
| KR | 20150118012 A | 10/2015 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

A 3MPixel Multi-Aperture Image Sensor with 0.7μm Pixels in 0.11μm CMOS, Fife et al., Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 2007, 9 pages.
Superimposed multi-resolution imaging, Carles et al., Publisher: Optical Society of America, 2017, 13 pages.
Viewfinder Alignment, Adams et al., Publisher: EUROGRAPHICS, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.
Office Action in related EP patent application No. 19845570.1, dated Jun. 9, 2020. 10 pages.
Office action in related KR patent application 2020-7002194, dated Feb. 16, 2021.
Office action in related EP patent application 19845570.1, dated Jan. 26, 2021.

* cited by examiner

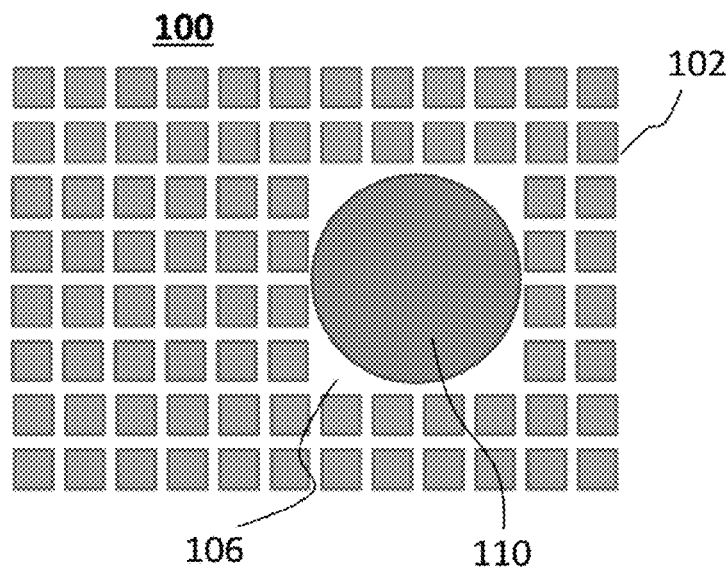
FIG. 1A  KNOWN ART
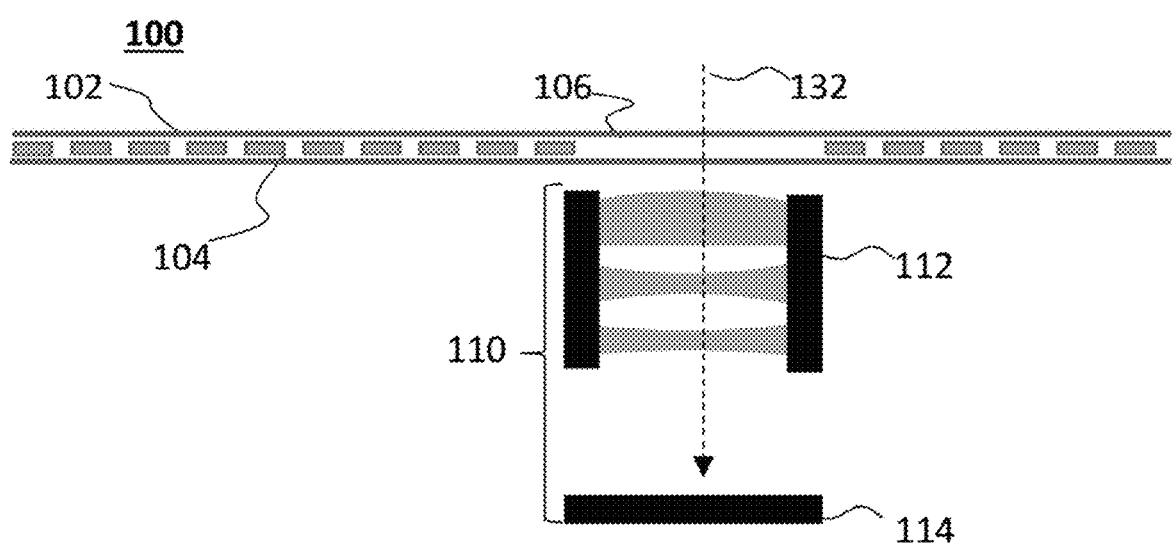
FIG. 1B  KNOWN ART

SWITCHABLE CONTINUOUS DISPLAY INFORMATION SYSTEM ABOVE CAMERA

CROSS REFERENCE TO RELATED APPLICATIONS

This application is a 371 application from international patent application PCT/IB2019/056225 filed Jul. 21, 2019, and claims the benefit of priority from U.S. Provisional patent application No. 62/714,685 filed Aug. 4, 2018, which is incorporated herein by reference in its entirety.

TECHNICAL FIELD

The presently disclosed subject matter is related in general to the field of digital cameras and displays.

BACKGROUND

In many modern electronic devices (e.g. a cellphone. TV, tablet, laptop etc.) a camera or another electronic device such a light emitting device can be placed below a non-active area or a gap in a device display. FIGS. 1A and 1B show a known display information system 100 in, respectively, a top view and a cross section. System 100 comprises a display 102 (e.g. LCD, LED, etc.) and a camera 110. The display is positioned "above" the camera in an imaging optical path. The term "above" refers to the position of the display being between an imaged scene (not shown) and the camera. Display 102 includes a primary (first) pixel array 104. Primary pixel array 104 may have a pixel density in the range of few hundreds pixels-per-inch (PPI), for example 400 to 500 PPI. A gap 106 in primary pixel array 104 allows light to enter a camera 110, as indicated by an arrow 132 in FIG. 1B. Camera 110 can therefore capture the scene.

Gap 106 may have several shapes, for example circular, rectangular or square shapes. A typical dimension of gap 106 (circle diameter or square side) may be on the order of 0.5-5 mm. As a result, primary pixel array 104 may be missing information of a few hundreds of pixels in the area of gap 106. Camera 110 comprises a lens 112 and an image sensor 114. Camera 110 may have a typical entrance pupil of 1-4 mm, such that the entrance pupil can be accommodated below gap 106. The term "below" refers to the position of the entrance pupil being between the primary pixel display plane and the camera. In the schematic FIGS. 1A, 1B, 2, 3, 4A and 4B, gap 106 is only a few pixels in size, and the figures should be understood as illustrative only and not to scale. As a result, system 100 does not have continuous display information, in particular in the area of gap 106.

It would be desirable to have the camera hidden behind the display, unseen by a user, such that the display area is maximized and display information is provided even in the area above the camera, i.e. to have continuous display information.

SUMMARY

Embodiments disclosed herein provide several ways for showing continuous display information, while having a camera, a light emitting device or a light receiving device located below a non-active area in the display. As used herein, the term "continuous" means that no information is missing in a section of the display that includes display pixels and a camera.

In exemplary embodiments there are provided systems, comprising a display having a first pixel array and a gap in the first pixel array in which at least some pixels of the first pixel array are missing, a camera, and a second pixel array, wherein the system is operable in a first operation mode in which the camera is operative to capture images and the second pixel array is not operative to display information, and in a second operation mode in which the camera is not operative to capture images and the second pixel array is operative to display the second array pixel information in the gap in the first pixel array.

In an exemplary embodiment, a system is further operable in a third operation mode in which the camera is operative to capture images and the second pixel array is operative to display information.

In an exemplary embodiment, the second pixel array is operative to display second pixel array information continuously with displayed first pixel array information.

In an exemplary embodiment, a system further comprises a projection lens, wherein, when the second pixel array is operative to display second pixel array information, the displayed second pixel array information is projected to fill in display information missing in the gap using the projection lens.

In an exemplary embodiment, a system further comprises an optical element, capable of splitting light entering the gap between the camera and the second pixel array.

In an exemplary embodiment, the optical element is a beam splitter and the light is split evenly between the camera and the second pixel array.

In an exemplary embodiment, the optical element is a beam splitter the light is split unevenly between the camera and the second pixel array, such that a majority of light is transferred to the camera. In an embodiment, the majority of light includes more than 80% of the light. In an embodiment, the majority of light includes more than 90% of the light.

In an exemplary embodiment, the second pixel array is mechanically moveable from a first position to a second position, wherein in the first position the displayed second pixel array information is displayed in the gap in the primary pixel array and wherein in the second position the displayed second pixel array information is not displayed in the gap in the first pixel array. In an embodiment, wherein in the second position the camera is operative to capture an image.

In an exemplary embodiment there is provided a system, comprising a display having a first pixel array and a gap in the first pixel array in which at least some pixels of the first pixel array are missing, a camera, and a second pixel array, wherein the camera is operative to capture images and the second pixel array is operative to display information in the gap in the first pixel array.

In exemplary embodiments, there are provided systems, comprising a display having a first pixel array and a gap in the first pixel array in which at least some pixels of the first pixel array are missing, a light emitting device, and a second pixel array, wherein the system is operable in a first operation mode in which the light emitting device is operative to emit light and the second pixel array is not operative to display information, and in a second operation mode in which the light emitting device is not operative to emit light and the second pixel array is operative to display the second array pixel information in the gap in the first pixel array. In an exemplary embodiment the system is further operable in a third operation mode in which the light emitting device is operative to emit light and the second pixel array is operative to display information.

In an exemplary embodiment there is provided a system, comprising a display having a first pixel array and a gap in the first pixel array in which at least some pixels of the first pixel array are missing, a light emitting device, and a second pixel array, wherein the light emitting device is operative to emit light and the second pixel array is operative to display information in the gap in the first pixel array.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated like numerals.

FIG. 1A shows a known display information system in a top view;

FIG. 1B shows the display information system of FIG. 1A in cross section,

DETAILED DESCRIPTION

Figure 2:
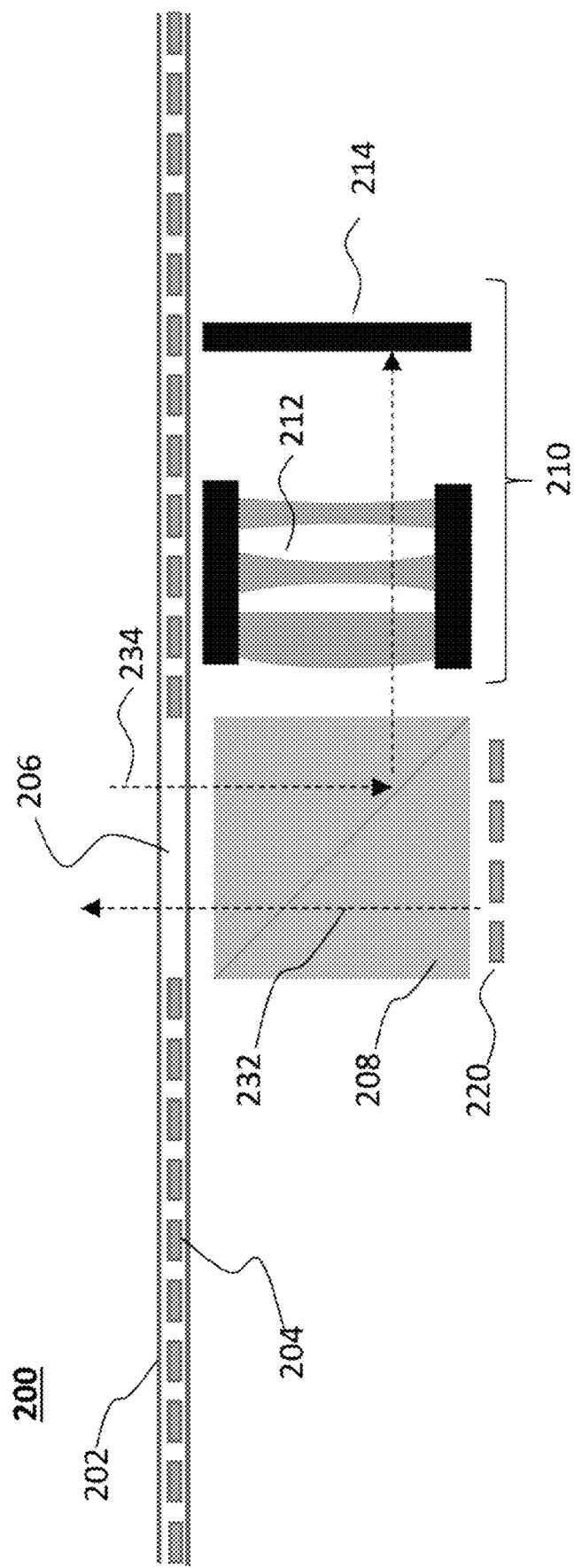
FIG. 2 shows in cross section one embodiment of a display information system disclosed herein.

FIG. 2 shows in cross section an embodiment numbered 200 of a continuous display information system disclosed herein. System 200 comprises a display 202 (e.g. a LCD, a LED, etc.) and a device 210 (e.g. a camera such as a red-green-blue (RGB) camera, a monochrome camera, an infrared (IR) camera, a time-of-flight (TOF) camera, etc.). While the embodiments below are described with reference to device 210 being a camera, in other embodiments device 210 may be a light emitting device, such as (but not limited to) a flood illuminator, a vertical cavity surface emitting laser (VCSEL) array, a pattern projector, a laser pointer, an IR source, etc. In yet other embodiments, 210 may be a light receiving device such as a photodiode or photodiode array. For simplicity, the following description refers to device 210 as "camera", with the understanding that it may also be a light emitting device or a light receiving device. Display 202 includes a primary (first) pixel array 204. A gap 206 in primary pixel array 204 allows light to enter camera 210. Camera 210 comprises a lens 212 and an image sensor 214. System 200 further comprises a beam splitter 208. Beam splitter 208 may be polarized or may be a standard beam splitter.

The following description for the operation modes and methods involving cameras applies also to a light receiving device. Thus, analyses and methods of use presented herein should apply to any light emitting or receiving optical device.

In an exemplary operation mode, beam splitter 208 allows some (in some cases 50% and in other cases up to 90%) of the light arriving at gap 206 to be reflected to camera 210, as indicated by an arrow 234 in FIG. 2. Camera 210 can therefore capture a scene (not shown in the figure). System 200 further comprises a secondary (second) pixel array 220. In an operation method, indicated by arrow 232 in FIG. 2, secondary pixel array 220 can provide information by illuminating the area of the missing pixels in primary pixel array 202, namely in gap 206. In a method of operation, light from secondary pixel array 220 indicated by an arrow 232 in FIG. 2 may pass through beam splitter 208 such that the light is seen to a user as being a part of primary pixel array 204, and seamless information is provided on the display. Since some of the light from secondary pixel array 220 may not arrive at gap 206, the illumination intensity of pixel array 220 may be higher than that of the primary pixel array such that the light intensity at gap 206 is equal to the light intensity of primary pixel array 204.

Figure 3:
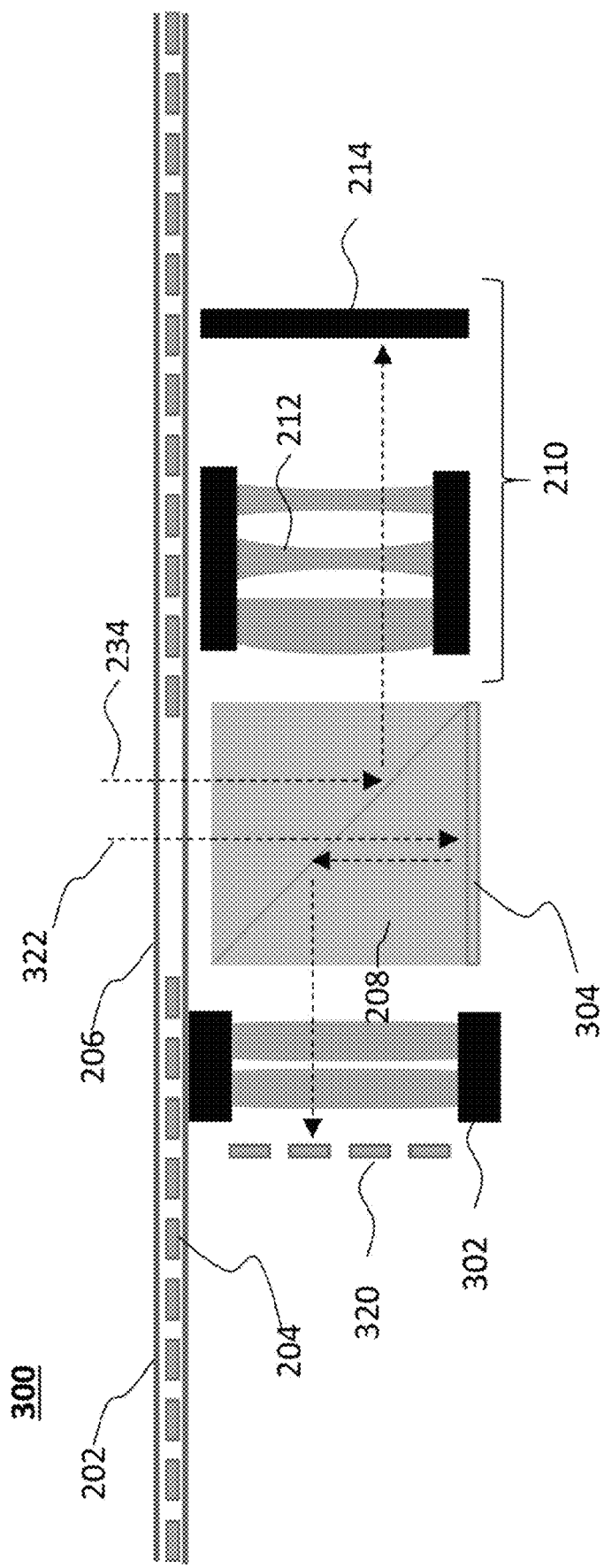
FIG. 3 shows in cross section another embodiment of a display information system disclosed herein.

FIG. 3 shows in cross section another embodiment numbered 300 of a continuous display information system disclosed herein. System 300 is similar to system 200, except for the following differences: (1) in system 300, a secondary pixel array 320 is located to a side of beam splitter 208, and (2), system 300 further comprises an optical imaging lens 302 located between secondary pixel array 320 and beam splitter 208, and a mirror 304 located below beam splitter 208.

In system 300, in one operation mode and as indicated by an arrow 322 in FIG. 3, light from secondary pixel array 320 may pass through imaging lens 302, be reflected by beam splitter 208 to mirror 304, be reflected back by mirror 304 to beam splitter 208 and be imaged in gap 206 in an embodiment, beam splitter 208 may be a polarized beam splitter and secondary pixel array 320 may be polarized such that all the light from secondary pixel array 320 may be reflected by the beam splitter to mirror 304. In another embodiment, mirror 304 can rotate the polarization of the light arriving from beam splitter 208 by 90 degrees (e.g. by being coupled to a lambda/4 plate) such that all the light arriving from mirror 304 will pass to gap 206.

In another operation mode, similar to the case in system 200 and as indicated by an arrow 234 in FIG. 3, light can enter from gap 206, be reflected by beam splitter 208 and enter camera 210 to form an image of a scene (the scene is not shown).

In yet another operation mode, light from secondary pixel array 320 may pass through imaging lens 302, be reflected by beam splitter 208 to mirror 304, be reflected back by mirror 304 to beam splitter 208 and be imaged in gap 206. Light can then enter through gap 206, be reflected by beam splitter 208 and enter camera 210 to form an image of a scene (not shown).

Figure 4A:
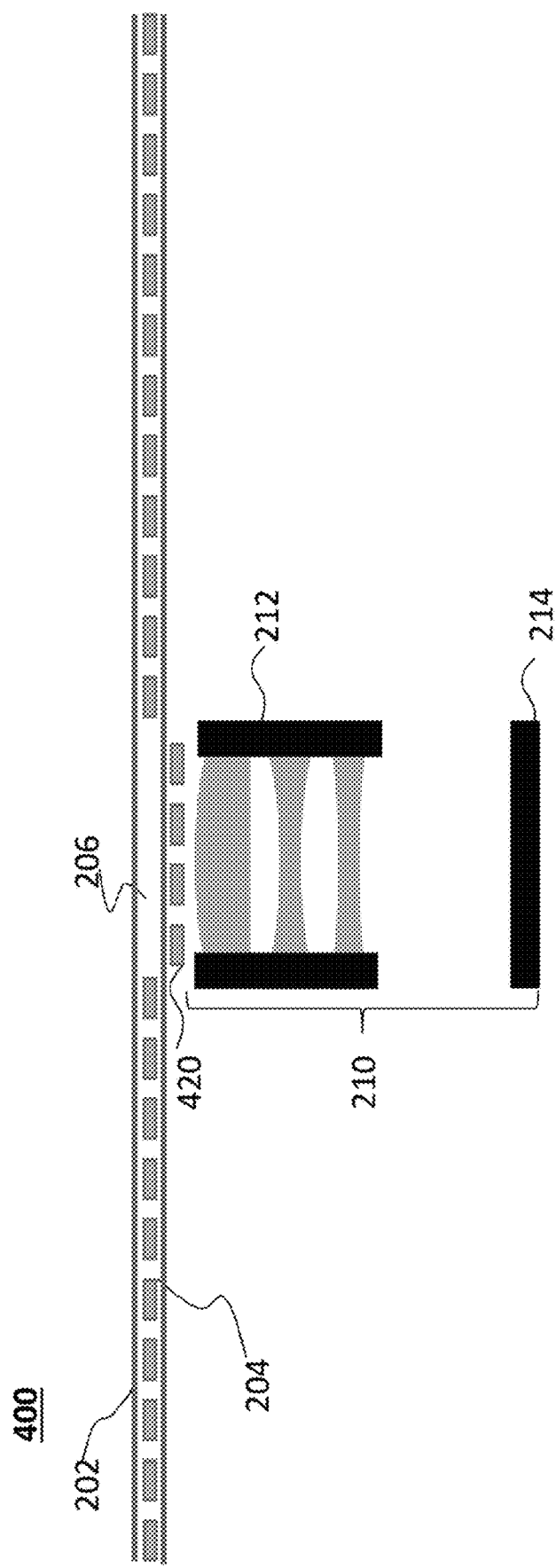
FIG. 4A shows in cross section yet another embodiment of a display information system disclosed herein in a first operation mode.
Figure 4B:
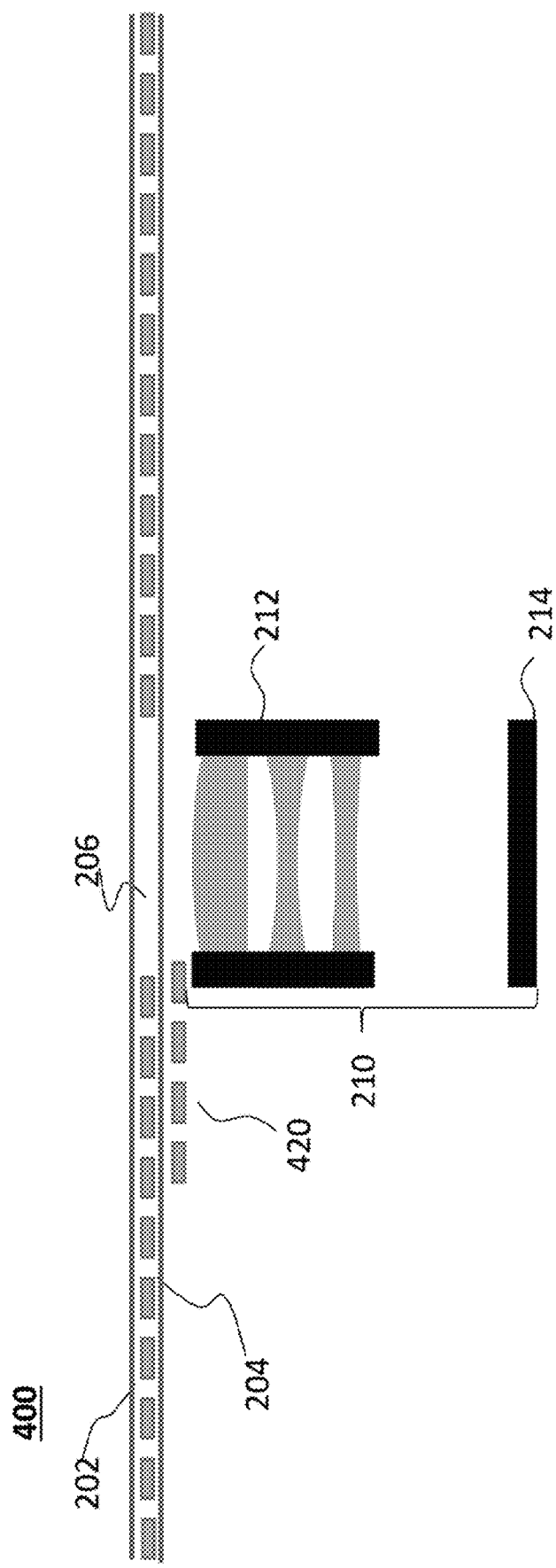
FIG. 4B shows in cross section the embodiment of FIG. 4A in a second operation mode.

FIGS. 4A and 4B show in cross section yet another embodiment numbered 400 of a continuous display information system disclosed herein. As in systems 200 and 300, system 400 comprises display 202 and camera 210, display 202 has a primary pixel array 204, and camera 210 comprise lens 212 and image sensor 214. System 400 further comprises a secondary pixel array 420. In a first operational mode (FIG. 4A), secondary pixel array 420 may be located under gap 206 such that a continuous display information is provided when camera 210 is not operational. In a second operational mode (FIG. 4B), secondary pixel array 420 may be mechanically shifted (e.g. using an electrical motor, an actuator, etc.) such that light can arrive to camera 210 from gap 206 to capture an image with camera 210.

Figure 5:
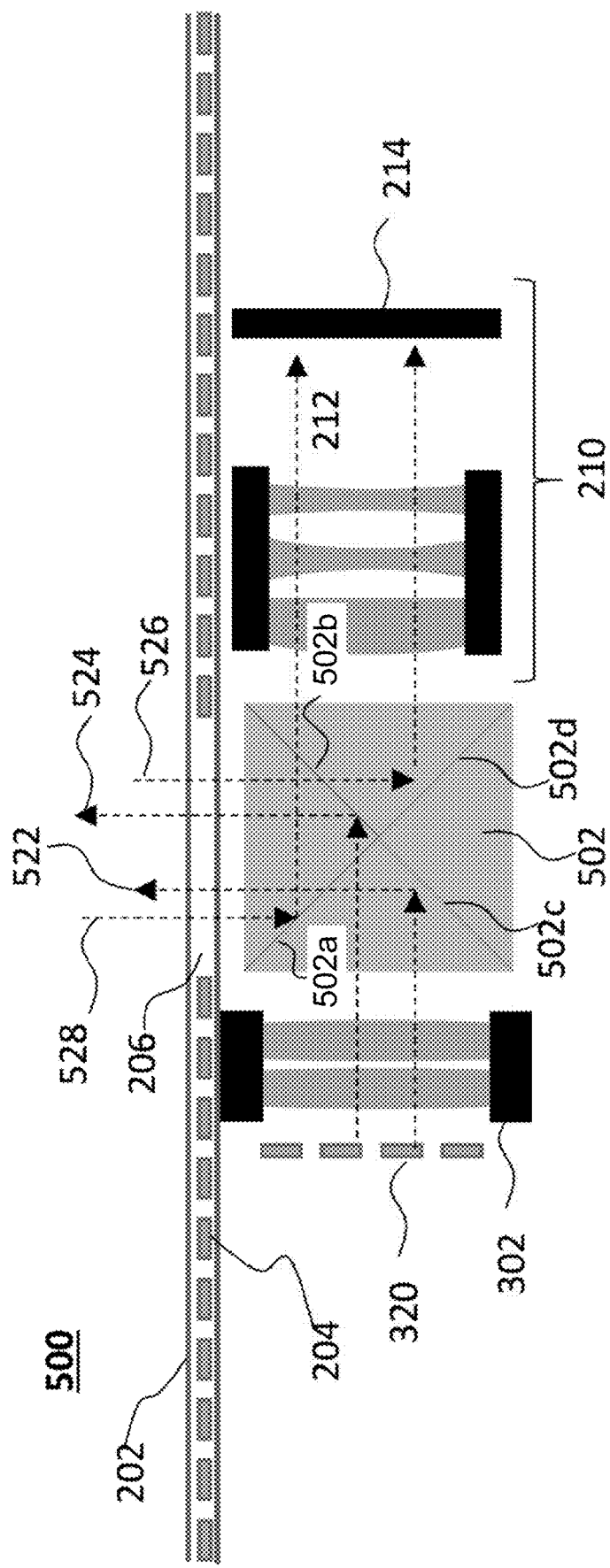
FIG. 5 shows in cross section yet another embodiment of a display information system disclosed herein in a second operation mode.

FIG. 5 shows in cross section yet another embodiment numbered 500 of a continuous display information system disclosed herein. System 500 is similar to system 300 except that beam splitter 302 is replaced with an optical element 502. Optical element 502 comprises four sections: two beam splitters 502a and 502b, each beam splitter having a reflection (or transmission) coefficient between 10% to 90%, and two fully reflective mirrors 502c and 502d with a 100% reflection coefficient.

In system 500, in a first operation mode, and as indicated by an arrow 522 in FIG. 5, light from secondary pixel array 320 may pass through imaging lens 302, be reflected by mirror 502c and be imaged in a left part of gap 206. In the same (first) operation mode, and as indicated by an arrow 524 in FIG. 5, light from secondary pixel array 320 may pass through imaging lens 302, pass beam splitter 502a and be reflected by beam splitter 502d and be imaged in a right part of gap 206. In a second operation mode, as indicated by arrows 526 and 528 in FIG. 5, light can enter from gap 206, be reflected by either beam splitter 502a or mirror 502d and enter camera 210 to form an image of a scene (not shown). In a third operation mode, light from secondary pixel array 320 may pass through imaging lens 302, be reflected by mirror 502c and be imaged in a left part of gap 206. In the third operation mode, and as indicated by an arrow 524 in FIG. 5, light from secondary pixel array 320 may pass through imaging lens 302, pass beam splitter 502a, be reflected by beam splitter 502d and be imaged in a right part of gap 206. Light can then enter from gap 206, be reflected by either beam splitter 502a or mirror 502d and enter camera 210 to form an image of a scene (not shown).

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A system, comprising:
    a display having a first pixel array and a gap in the first pixel array in which at least some pixels of the first pixel array are missing;
    a camera;
    a second pixel array; and
    an optical element, capable of splitting light entering the gap between the camera and the second pixel array,
    wherein the system is operable in a first operation mode in which the camera is operative to capture images and the second pixel array is not operative to display information, and in a second operation mode in which the camera is not operative to capture images and the second pixel array is operative to display the second array pixel information in the gap in the first pixel array.

2. The system of claim 1, wherein the optical element is a beam splitter.

3. The system of claim 1, wherein the light is split evenly between the camera and the second pixel array.

4. The system of claim 1, wherein the light is split unevenly between the camera and the second pixel array, such that a majority of light is transferred to the camera.

5. The system of claim 4, wherein the majority of light includes more than 80% of the light.

6. The system of claim 4, wherein the majority of light includes more than 90% of the light.

7. A system, comprising:
    a display having a first pixel array and a gap in the first pixel array in which at least some pixels of the first pixel array are missing;
    a camera; and
    a second pixel array;
    wherein the system is operable in a first operation mode in which the camera is operative to capture images and the second pixel array is not operative to display information, and in a second operation mode in which the camera is not operative to capture images and the second pixel array is operative to display the second array pixel information in the gap in the first pixel array, and
    wherein the second pixel array is mechanically moveable from a first position to a second position, wherein in the first position the displayed second pixel array information is displayed in the gap in the primary pixel array, and wherein in the second position the displayed second pixel array information is not displayed in the gap in the first pixel array.

8. The system of claim 7, wherein in the second position the camera is operative to capture an image.

* * * * *